United States Patent [19]
Orr

(10) Patent No.: US 6,952,236 B2
(45) Date of Patent: Oct. 4, 2005

(54) SYSTEM AND METHOD FOR CONVERSION OF TEXT EMBEDDED IN A VIDEO STREAM

(75) Inventor: Stephen J. Orr, Markham (CA)

(73) Assignee: ATI Technologies, Inc., Thornhill (CA)

( * ) Notice: Subject to any disclaimer, the term of this patent is extended or adjusted under 35 U.S.C. 154(b) by 690 days.

(21) Appl. No.: 09/933,310

(22) Filed: Aug. 20, 2001

(65) Prior Publication Data

US 2003/0035063 A1 Feb. 20, 2003

(51) Int. Cl.$^7$ .............................. H04N 7/00; H04N 7/01
(52) U.S. Cl. ........................ 348/465; 348/441; 348/468; 348/467
(58) Field of Search ................................. 348/441, 461, 348/467, 468, 476, 478, 589, 600, 465; H04N 7/01, 7/00, 5/278

(56) References Cited

U.S. PATENT DOCUMENTS 5,500,680 A * 3/1996 Lee ............................. 348/468

FOREIGN PATENT DOCUMENTS

JP 2001008161 A * 1/2001 ............ H04N/5/91

* cited by examiner

Primary Examiner—Sherrie Hsia
(74) Attorney, Agent, or Firm—Toler, Larson & Abel, LLP

(57) ABSTRACT

A system and method for converting text data having a Teletext format to text data having an Electronics Industries Associations-608 (EIA-608) format are illustrated herein. A video stream with embedded text data having a Teletext format is received by a dual mode text processing system. The dual mode text processing system, in one embodiment, extracts the text data and filters the text data to identify a desired portion using an identifier, such as a page identifier or number. The desired portion (or a copy thereof), once identified, is sent to a line break parser. The line break parser, in one embodiment, eliminates some or all of any unnecessary or unintended line breaks, as well as some or all of any extra space characters, to generate a character stream. The character stream, in one embodiment, is then converted into a EIA-608 format by a line convertor, wherein the character stream is parsed into one or more subtitle lines with a maximum character length. An end-of-line break, in one embodiment, is added to the end of each subtitle line. The output of the line convertor, in one embodiment, is buffered by a rate modulator which outputs the buffered text data at a specified rate to minimize the character transmission rate disparity between the Teletext and EIA-608 specifications. The output of the rate modulator can then be encoded into an EIA-608 format by an EIA-608 encoder. The EIA-608 encoded data can then be decoded by a closed captioning decoder and displayed as Closed Captioning text subtitles, stored in file storage, processed by a software or hardware application, and the like.

80 Claims, 4 Drawing Sheets

SYSTEM AND METHOD FOR CONVERSION OF TEXT EMBEDDED IN A VIDEO STREAM

FIELD OF THE DISCLOSURE

The present invention relates generally to processing video data and more particularly to the conversion of embedded text data from a first format to a second format.

BACKGROUND

Video streams, such as television broadcasts or video streamed over a network, often contain embedded text data along with video display data. The embedded text data, which is usually transmitted during vertical blanking intervals, can include news, sports information, weather information, or subtitles based on the dialog of the video display. As a result of the wealth of information provided by the embedded text data, a number of software and hardware applications have been developed to process and/or analyze the embedded text. For example, applications have been developed that search Closed Captioning text for keywords and then generate a transcript based on the text surrounding the keyword. Other applications have been developed to display subtitle text in a separate window so as to not interfere with the display of the video. Additionally, many displays, such as televisions, can display subtitle text in conjunction with the video display.

However, the functionality of these displays and applications is limited due the variety of formats of the embedded text. The two formats most widely used include the Teletext format and the EIA-608, or Closed Captioning, format. These two formats are generally incompatible as a result of the difference in location(s) of the text data during the vertical blanking interval, the difference between the number of characters per subtitle line, and/or the data/character transmission rate. This incompatibility between the Teletext and Closed Captioning formats renders applications and displays developed for one format useless when presented with text data in the other format. For example, televisions designed to process embedded text according to a Closed Captioning format are generally incapable of handling video steams having embedded text with a Teletext format, and vice versa. Likewise, Teletext-enabled video broadcasts often cannot be analyzed since applications to search Teletext data for keywords in the subtitles have not yet been developed. Accordingly, the embedded text must either go unutilized, or the video stream must carry embedded text in both formats, a process that is practically impossible as the two specifications define the use of the vertical blanking interval (VBI) data in different and generally incompatible ways.

Given these limitations, as discussed, it is apparent that a system and/or method to address some of the shortcomings of the prior art would be advantageous.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In accordance with at least one embodiment of the present invention, a first text portion having a first format is identified, wherein the first text portion is embedded in a video stream. The first text portion having the first format is converted to a second text portion having a second format different from the first. One advantage in accordance with a specific embodiment of the present invention is that format-specific applications and/or displays can utilize embedded text data initially having an incompatible format.

FIGS. 1–4 illustrate a system for converting text data having a Teletext format to text data having a Closed Captioning format, as well as a method for its use. A video stream with embedded text data having a Teletext format is received by a dual mode text processing system. The dual mode text processing system, in one embodiment, extracts the text data and filters the text data to identify a desired portion using an identifier, such as a page number. The desired portion (or a copy thereof), once identified, is sent to a line break parser. The line break parser, in one embodiment, eliminates some or all of any unnecessary, or unintended, line breaks, as well as some or all of any extra space characters, to generate a character stream. The character stream, in one embodiment, is then converted into a Closed Captioning format by a line convertor, wherein the character stream is parsed into one or more subtitle lines with a maximum character length. An end-of-line break, in one embodiment, is added to the end of each subtitle line. The output of the line convertor, in one embodiment, is buffered by a rate modulator which outputs the buffered text data at a specified rate to minimize the character transmission rate disparity between the Teletext and EIA-608 specifications. The output of the rate modulator can then be encoded into an EIA-608 format by an EIA-608 encoder. The EIA-608 encoded data can then be decoded by a closed captioning decoder and displayed as Closed Captioning text subtitles, stored in file storage, processed by a software or hardware application, and the like.

Figure 1:
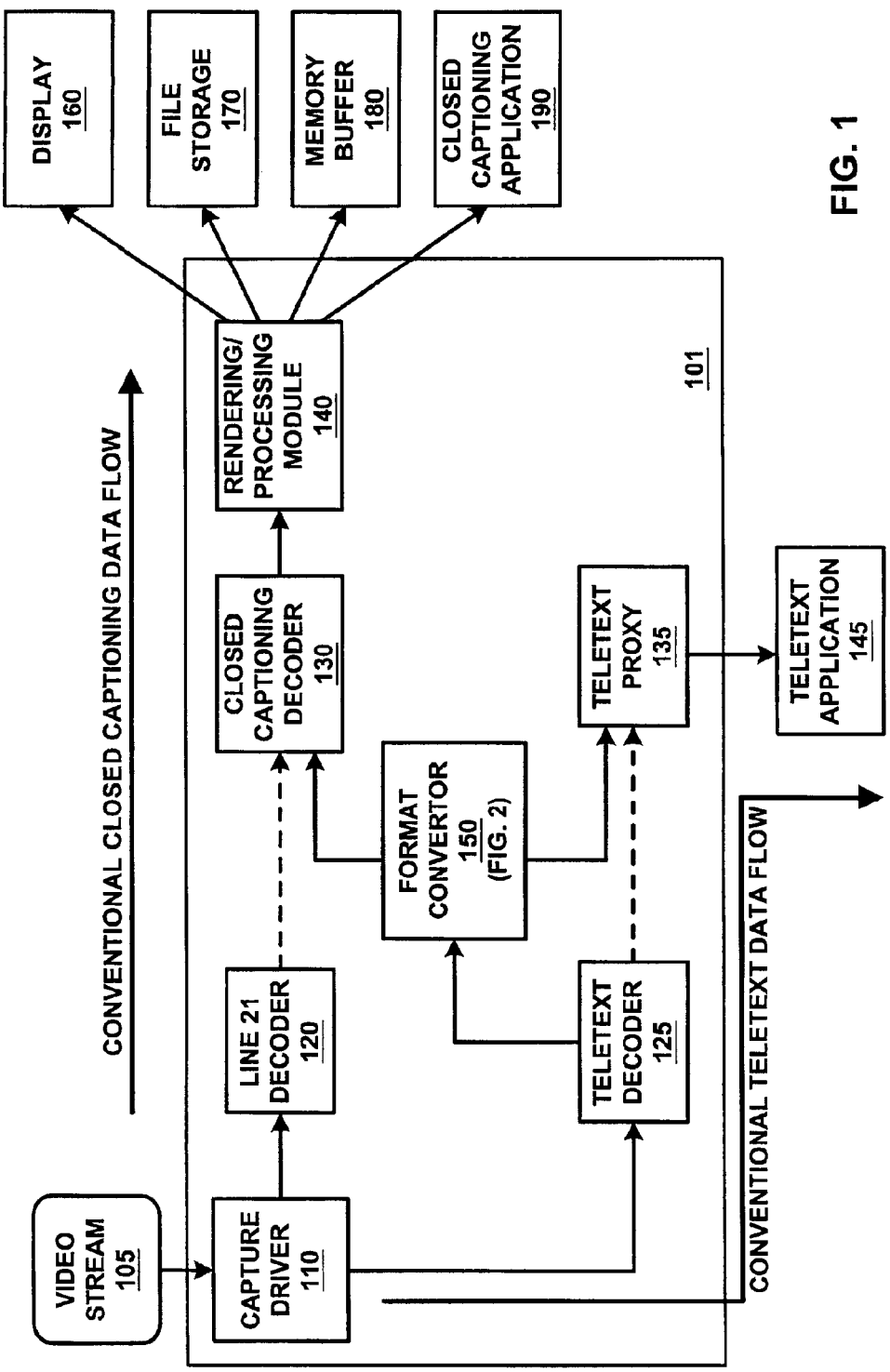
FIG. 1 is a block diagram illustrating a dual mode text processing system according to at least one embodiment of the present invention.

Referring now to FIG. 1, a dual mode text processing system is illustrated according to at least one embodiment of the present invention. Although one embodiment wherein embedded text is converted from a Teletext format to a Closed Captioning format is illustrated in FIGS. 1–4 for the purpose of discussion, it will be appreciated that the embodiments of the present invention described herein may be applied, with minimal modification, to other embodiments of the present invention wherein embedded text is converted from and/or to other text formats. It will be appreciated that EIA-608 includes the Closed Captioning standard, therefore the terms "EIA-608 format" and "Closed Captioning format" are used interchangeably herein unless otherwise noted.

In general, the two most widely used television subtitle formats include the Teletext format and the EIA-608, or Closed Captioning, format. A conventional Teletext processing system typically includes capture driver 110, Teletext decoder 125, Teletext proxy 135, and Teletext application 145. Video stream 105 is transmitted to the conventional Teletext processing system where it is processed for display and/or for manipulation by a Teletext application 145, such as a separate Teletext display window. Video stream 105, in this case, can include a variety of video transmission streams or signals having Teletext data embedded within the stream or signal. For example, video stream 105 can include a terrestrial or satellite television broadcast of one or more television channels, a video stream received over the Internet, and the like.

In general, video stream 105 is received by capture driver 110 as data received as part of the vertical blanking interval (VBI). Capture driver 110, in one embodiment, parses video stream 105 into video display information, which can then be sent to a display or graphics controller. Capture driver 110 can include a software driver for a television tuner card, a filter implemented in hardware, and the like. Teletext decoder 125 can then decode the VBI data to generate Teletext data that is processed further by Teletext proxy 135 and then passed on to Teletext application 145. For example, Teletext decoder 125 can decode a particular page, such as page 888, of the Teletext data embedded within a VBI of video stream 105 to generate subtitle information which can then be formatted for display by Teletext proxy 135 and displayed. Note that, in general, Teletext data is transmitted as an encoded bit stream, and may include data other than text data, such as time stamps, page and sub-page numbers, channel identifications, and the like. However, since the parsing of an embedded stream into a separate text stream is well known to those skilled in the art, Teletext data, or text data having a Teletext format, is discussed herein as a text data stream for ease of discussion.

Similarly, a conventional Closed Captioning processing system typically includes capture driver 110, line 21 decoder 120, closed captioning decoder 130, and render/processing module 140. As with the conventional Teletext processing system, capture driver 110 generally parses video stream 105 into video display data and VBI data. Line 21 decoder 120 can then extract data found on line 21 of the vertical blanking interval, in accordance with the National Television Standards Committee (NTSC) format (i.e. EIA-608), and transmit the extracted data to closed captioning decoder 130. Closed captioning decoder 130 can then decode the output from line 21 decoder 120 to generate closed captioning text data which can be further processed by render/processing module 140 (similar to Teletext proxy 135). For example, render/processing module 140 could render the closed captioning text data into video display data and combine this data with the visual display data parsed from video stream 105 by capture driver 110 to generate a video output for display on display 160, where display 160 can include a television, a computer monitor, and the like.

However, due to differences between the Teletext and EIA-608 formats, conventional closed captioning processing systems are unable to handle video streams 105 with embedded text data having a Teletext format and vice versa. Accordingly, in at least one embodiment, dual mode text processing system 101 receives video stream 105 having a Teletext format and reformats the embedded text data into a EIA-608 format. Dual mode text processing system 101 includes capture driver 110, line 21 decoder 120, Teletext decoder 125, format convertor 150, closed captioning decoder 130, and render/processing module 140. In at least one embodiment, dual mode text processing system 101 is capable of a dual-mode operation wherein Teletext data embedded in video stream 105 can be handled conventionally as Teletext data (such as by Teletext application 145), or the Teletext data can be converted, using methods described herein, to a EIA-608 format for display, storage, or processing by applications that manipulate data representative of text having an EIA-608 format. In this case, dual mode text processing system 101 can also include other elements of conventional Teletext processing systems, such as Teletext application 145. Additionally, in one embodiment, dual mode text processing system 101 is also capable of handling video stream 105 with embedded text data having an EIA-608 format in a conventional manner or dual mode text processing system can convert the embedded text data from the EIA-608 format to a Teletext format, where it can then be handled or processed by Teletext proxy 135 and/or Teletext application 145.

In at least one embodiment, video stream 105 with embedded data representative of text having a Teletext format is parsed into video display data and VBI information by capture driver 110 as discussed previously. Likewise, Teletext decoder 125 can decodes the VBI information to generate the text data having a Teletext format. However, in at least one embodiment, rather than directing the output of Teletext decoder 125 directly to Teletext proxy 135 as in a conventional Teletext processing system, dual mode text processing system 101 routes the output to format convertor 150. Format convertor 150, in at least one embodiment, filters the text data output by Teletext decoder 125 to identify a desired portion based on an identifier, such as a page identifier. When the identifier is found, the associated desired text data portion, in one embodiment, is converted from a Teletext format to an EIA-608 format and transmitted to closed captioning decoder 130 for closed captioning decoding in a conventional manner. For example, format convertor 150 could filter the output of Teletext decoder 125 for data associated with a subtitle page (often identified as page 888). When the subtitle page is identified, all text data associated with the subtitle page could then be converted to an EIA-608 format and sent to closed captioning decoder 130. Similarly, part or all of the output of Teletext decoder 125 could be sent to Teletext proxy 135 for additional processing. Format convertor 150 is discussed in greater detail subsequently.

The converted text data output from format convertor 150, in one embodiment, is decoded by closed captioning decoder 130 and processed by rendering/processing module 140 in a manner similar to conventional closed captioning processing systems, as discussed previously. For example, dual mode text processing system 101, in one embodiment, could extract the embedded text data having a Teletext format, convert it text data having a closed captioning format, and then process and display the converted text data on a television or computer monitor (display 160). Likewise, the converted text data could be stored in a hard disk or optical disc (file storage 170) or in memory buffer 180.

In at least one embodiment, the converted text data is made available for processing by Closed Captioning (CC) application 190, which can include a software program or hardware that can process text data having a EIA-608 format. For example, CC application 190 can include a software application that scans Closed Captioning text for one or more keywords, and when found, CC application 190 generates a still image or a video clip of the video based on the location of the keywords. CC application 190 could also include a software application that creates text transcripts of a television program or show based on Closed Captioning text. Similarly, CC application 190 could generate a more advanced transcript with images using hypertext markup language (HTML) or rich-text format (RTF), and the like. Memory buffer 180 can be used in conjunction with CC application 190. For example, the converted text data could be stored in memory buffer 180 and displayed as subtitle text on display 160 at the same time. In this case, a user could use CC application 190 to extract previously displayed Closed Captioning text, thereby allowing a user to scroll back through the Closed Captioning history. CC application 190 could also include a software application that displays the converted text as subtitle text whenever an audio output associated with video stream 105 is muted. Although various embodiments of CC application 190 have been discussed herein, CC application 190 can include other software or hardware applications that make use of Closed Captioning text without departing from the spirit or the scope of the present invention.

In at least one embodiment, some or all of the output of Teletext decoder 125 can be passed on to Teletext proxy 135 after being searched and/or filtered for the desired identifier. By passing the output of Teletext decoder 125 to Teletext proxy 135 in addition to filtering the output for a certain desired portion, dual mode text processing system 101, in one embodiment, is capable of implementing both processes that handle text data having a Teletext format as well as processes that handle text having a EIA-608 format. For example, format convertor 150 could pass the entire output of Teletext decoder 125 to Teletext proxy 135 for processing by Teletext application 145. At the same time, data associated with a subtitle page converted to an EIA-608 format could be passed on to closed captioning decoder 130 for decoding and further processing by rendering/processing module 140 for display on display 160 or handling by CC application 190.

By converting text data having a Teletext format embedded in video stream 105 into text data having a EIA-608 format, or vice versa, the text data can be processed by CC applications 190 and/or displayed on display 160 that would otherwise be unable to use the text data since it originally was in an incompatible format. For example, most conventional televisions in North America are capable of decoding and processing text data having a Closed Captioning format, but are unable to process text data having a Teletext format. As a result, these televisions would be unable to display and/or process text data embedded in television content produced in Europe or other areas where many television broadcasts include text data having a Teletext format. However, dual mode text processing system 101, in one embodiment, would be able to handle text data having either a Teletext format or an EIA-608 format due to the conversion from one format to another performed by format convertor 150.

Figure 2:
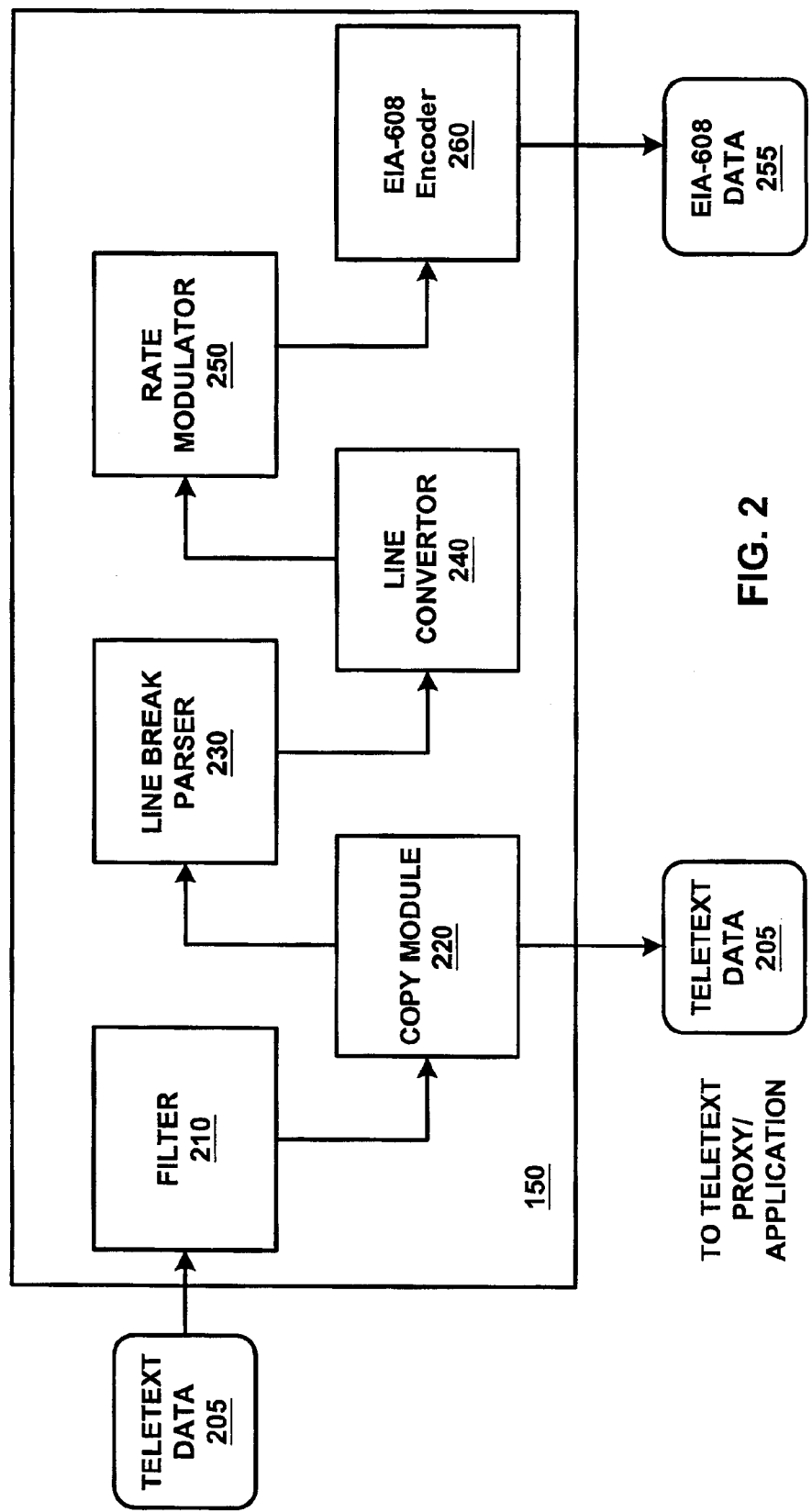
FIG. 2 is a block diagram illustrating a format convertor of the dual mode text processing system illustrated in FIG. 1 according to at least one embodiment of the present invention.

Referring now to FIG. 2, format convertor 150 is illustrated in greater detail according to at least one embodiment of the present invention. Format convertor 150 includes filter 210, copy module 220, line break parser 230, line convertor 240, rate modulator 250, and EIA-608 encoder 260. As discussed previously, Teletext decoder 125 (FIG. 1), in one embodiment, extracts text data having a Teletext format embedded in video stream 105 (FIG. 1) and converts it to text data having an EIA-608 format (EIA-608 data 255). The text data having a Teletext format, herein referred to at Teletext data 205, in one embodiment, is identified by filter 210 based on an identifier, such as a page identifier or page number, associated with Teletext data 205. For example, in at least one embodiment, dual mode text processing system 101 (FIG. 1) is utilized to convert Teletext subtitle text to Closed Captioning text. In this case, filter 210 could use a page number associated with a Teletext subtitle page to identify the subtitle text data. In Europe, the subtitle page is often page 888 (or page 777 in Italy). Accordingly, filter 210 could search Teletext data 205 for page 888 and extract the associated text data.

A variety of methods can be utilized to determine the page identifier used by filter 210. In one embodiment, a page identifier is preset by dual mode text processing system 101. For example, if filter 210 is to search Teletext data 205 for a subtitle page, the page identifier used by filter 210 could be set to page 888 since page 888 is a common page number used to identify subtitle pages. Additionally, in one embodiment, the page identifier could be set based on a geographical location, much like the country code used by many digital versatile disc (DVD) players. For example, those dual mode text processing systems 101 that are to be used in the United Kingdom could be set to use page 888 as the identifier used by filter 210, whereas those dual mode text processing systems 101 that are to be used in Italy could use page 777 as the identifier. Likewise, in one embodiment, the page identifier could be determined based on the transmission source of video stream 105 (FIG. 1). For example, an element of dual mode text processing system 101 could use an broadcast station identifier included in video stream 105 in conjunction with a look-up table to determine the page number used by a certain broadcast station to identify a subtitle page. Similarly, in one embodiment, one or more subtitle pages of Teletext data 205 include a subtitle identifier flag that identifies a subtitle page as such. In this case, filter 210 can search for subtitle identifier flags to identify subtitle pages of Teletext data 205.

Alternatively, in one embodiment, the page identifier is set based on user input. For example, dual mode text processing system 101, in one embodiment, is implemented as part of a television tuner card of a personal computer. In this case, a user could access a setup menu generated by software associated with the television tuner card and displayed on a computer monitor. The user could then submit the desired page identifier to the setup menu using a mouse or keyboard. Although a number of methods for determining a page identifier for a desired portion of Teletext data 105 have been discussed, other methods for determining a page identifier may be used without departing from the spirit or the scope of the present invention.

After the desired portion of Teletext data 205 to be converted to a Closed Captioning format has been identified by filter 210, copy module 220, in one embodiment, generates a copy of the desired portion of Teletext data 205. As discussed previously, in at least one embodiment, all or part of Teletext data 205 is passed on to Teletext proxy 135 (FIG. 1) for any additional processing. In this case, copy module 220 can pass the copy of the desired portion of Teletext data 205 to line break parser 230 and send all or part of the original Teletext data 205 to Teletext proxy 135. By copying the desired portion and passing the original Teletext data 205 on to Teletext proxy 135, dual mode text processing system 101 (FIG. 1), in one embodiment, is capable of utilizing applications that manipulate text data having a Closed Captioning format as well as applications that manipulate text data having a Teletext format simultaneously. In other embodiments, filter 210 extracts the desired portion from Teletext data 205 and discards the remaining Teletext data 205 without passing it on to Teletext proxy 135. In this case, copy module 220 can be omitted, and any reference to a copy of the desired portion of Teletext data 205 (identified by filter 210) also applies to the data extracted by filter 210.

Line break parser 230, in one embodiment, parses the output of copy module 220 to remove some or all of the end-of-line breaks, or unintended line breaks, while keeping some or all of the deliberate line breaks. For example, since the Teletext format generally specifies a maximum character width of 40 characters per subtitle line for display, sentences and/or words having more than 40 characters generally must be divided among two or more subtitle lines. The end-of-line break, i.e. the break point of the word or sentence caused by the limitation of the character width of a subtitle line, is herein referred to as an unintentional break. For example, a sentence having 65 characters (including spaces) could have the first 40 characters on the first line, while the second 25 characters could be displayed on the second line. The end-of-line break, or unintentional break, in this example, would occur after the $40^{th}$ character. On the other hand, deliberate line breaks, such as the end of a paragraph are often included as part of the subtitle text to provide the proper paragraph structure or to illustrate a lapse in time. Accordingly, line break parser 230 removes some or all of the unintentional line breaks since they are a result of the subtitle line formatting while keeping some or all of the intended line breaks since they are inherent to the desired display of the subtitle text. The operation of line break parser 230 is discussed in greater detail with reference to FIG. 3.

Line convertor 240, in one embodiment, reformats the output of line break parser 230 to generate text data in compliance with an EIA-608 format. For example, the EIA-608 format generally specifies a subtitle line character width of no more than 32 characters per line. In this case, line convertor 240 could format the output of line break parser 230 such that no more than 32 characters are included in each subtitle line. In general, the data transmission rate of the Teletext specification differs greatly from the data transmission rate of the Closed Captioning specification. Closed Captioning text is usually transmitted at a rate of around 60 characters per second, whereas an entire subtitle page of Teletext text is usually transmitted during one VBI interval at a rate much greater than 60 characters per second. As a result of the difference in the data transmission rates, it is possible that the display or manipulation of the Teletext text converted to Closed Captioning text could result in an overflow or underflow. For example, since Teletext text data is often transmitted much faster than 60 characters per second, the display of the Teletext text data as Closed Captioning (CC) text could result in the CC text being displayed much faster than could be read by a viewer. For example, if the display (display 160, FIG. 1) is set up to display two lines of CC subtitle text, for a maximum of 64 characters total, and Teletext text data is received and converted to CC text at a rate much greater than 60 characters per second, the display could scroll through multiple subtitle lines long before a viewer could read the original two lines of Closed Captioning subtitle text. The difference between the transmission rates could also result in a loss of synchronization between the subtitle text and video display. For example, the subtitle text could represent a dialog of the video display. However, since Teletext data 205 is transmitted at a rate greater than the rate for Closed Captioning text, the converted Teletext text could be displayed before the associated scene in the video display.

Accordingly, in at least one embodiment, rate modulator 250 resolves the input transmission rate (from video stream 105) with the output transmission rate (to display 160 and/or Closed Captioning application 190, etc.). Rate modulator 250, in one embodiment, includes a first-in/first-out (FIFO) buffer (not illustrated) to store EIA-608 data 255 (converted from Teletext data 205) before it is output at a specified rate. The FIFO buffer could be implemented as system memory, such as random access memory, in the video memory of a television tuner card, in a cache, and the like. In one embodiment, the specified rate is predetermined. For example, it could be experimentally determined that a certain output rate results in acceptable results. To illustrate, it could be determined that a rate of 1.5 times the typical Closed Captioning rate (usually 60 characters per second) provides an adequate tradeoff between synchronization and/or viewing time and the necessary FIFO buffer size. Alternately, in one embodiment, the specified rate is determined dynamically. For example, rate modulator 240 could monitor the size of the FIFO buffer. If the buffer exceeds a certain size, rate modulator 240 could increase the output rate. On the other hand, if the size of the FIFO buffer falls below a certain size, such as 64 characters (about 2 seconds worth of 1-line CC subtitle display), rate modulator 240 could decrease the output rate to further populate the FIFO buffer. By dynamically increasing and/or decreasing the output rate, rate modulator 240 could maintain the size of the FIFO buffer within an optimal range.

The disparity of the difference in data transmission rates can also be exacerbated when an incorrect portion of Teletext data 205 is converted to EIA-608 data by format convertor 150. For example, if a user were to incorrectly identify a main text page (page 100) as a subtitle text page (page 888) of a Teletext data transmission, the relatively large amount of text data associated with the main text page could possibly cause the FIFO buffer of rate modulator 250 to overflow when converted to EIA-608 data 255. In order to prevent buffer overflow, rate modulator 250 can take a number of actions. In one embodiment, rate modulator 250 transmits the converted text (EIA-608 data 255) associated with the page at a maximum rate to prevent buffer overflow. It will be appreciated that transmission at a rate that a receiving application (Closed Captioning application 190, FIG. 1) or display 160 (FIG. 1) is incapable of handling properly, or dropping data, could cause errors in the processing of the transmitted EIA-608 data 255.

Alternatively, in another embodiment, text data associated with a converted page of text is discarded by rate modulator 250. It will be appreciated that a same set of data associated with certain pages of Teletext data 205 may be transmitted repeatedly. For example, if a user were to incorrectly select a main text page (such as page 100) for conversion into Closed Captioning subtitle text, the main text page would repeatedly be sent with little or no variance between successive versions of the page. Accordingly, in at least one embodiment, rate modulator 250 compares the output of line convertor 240 associated with a decoded page for an exact or substantial match in the FIFO buffer of rate modulator 250. If a match is found, it can be assumed that the decoded page is not the correct page, since the same text data is sent over and over again, rather than changing, as subtitle text data generally would. Accordingly, in one embodiment, rate modulator 250 excludes the incoming text data associated with the incorrect page from being stored in the FIFO buffer. Likewise, rate modulator 250 could also purge the same text data from the FIFO buffer. Alternatively, rate modulator 250, in one embodiment, searches the text data for a subtitle identifier flag. If the subtitle identifier flag is not present, rate modulator could exclude the incoming text data from being stored in the FIFO buffer or purge the associated text data after being stored in the FIFO buffer. After an acceptable output rate is determined, the output of rate modulator 250, in one embodiment, is provided to EIA-608 encoder 260.

EIA-608 encoder 260, in one embodiment, converts the data format of the text data. For example, Closed Captioning text is usually provided in character pairs consisting of two characters having a 7-bit American Standard Code for Information Interchange (ASCII) format. In this case, EIA-608 encoder 260 can convert the output of rate modulator 250 into character pairs having a 7-bit ASCII format. The output of EIA-608 encoder 260 can be provided to closed captioning decoder 130 (FIG. 3) as EIA-608 data 255 where it can be processed like any other type of data having a EIA-608 format.

Figure 3:
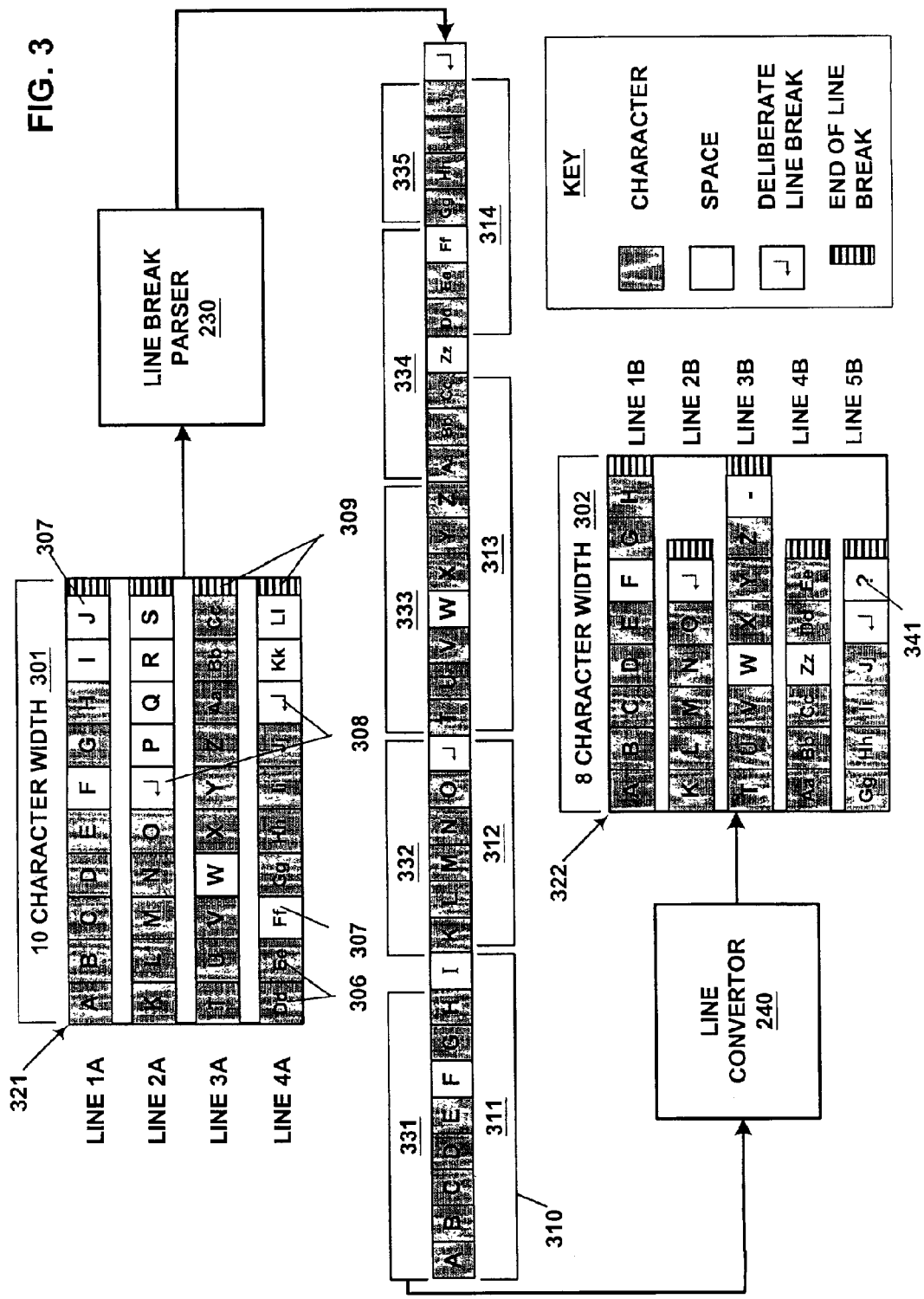
FIG. 3 is a block diagram illustrating a method of line parsing and line conversion according to at least one embodiment of the present invention.

Referring to FIG. 3, a method for converting text data having a Teletext format into text data having a Closed Captioning format is illustrated according to at least one embodiment of the present invention. As discussed previously, format convertor 150 (FIG. 1), in one embodiment, converts text data having a Teletext format, herein referred to as Teletext format 301, into text data having a EIA-608 format, herein referred to as Closed Captioning format 302. Although the Teletext format and Closed Captioning format generally specify a maximum of 40 characters per subtitle line display lie format, and 32 characters per subtitle line display line format, respectively, for ease of illustration, Teletext format 301 and Closed Captioning format 302 are illustrated in FIG. 3 as having a display line format of 10 characters per subtitle line and 8 characters per subtitle line respectively.

Recall that, in one embodiment, filter 210 (FIG. 2) identifies a desired portion of Teletext data 205, herein referred to as Teletext portion 321, for conversion from a Teletext format to a text portion having an EIA-608 format, herein referred to as EIA-608 portion 322. Teletext portion 321 (or a copy thereof), in one embodiment is sent to line break parser 230 for conversion to character stream 310. Teletext portion 321, in general, is composed of a variety of displayable alphanumeric characters, as well as non-displayable characters, such as line breaks, color formatting information, simple graphics, etc. As illustrated in FIG. 3, Teletext portion 321 includes alphanumeric characters 306, space characters 307, deliberate line breaks 308, and unintended line breaks 309 (also referred to as end-of-line breaks) in subtitle lines 1A–4A, each having 10 characters, resulting in a total of 40 characters (not including unintended line breaks 309).

Alphanumeric characters 306 can include any displayable alphanumeric character other than the space character, such as letters, numbers, punctuation, and the like. Space character 307 includes the space character. Deliberate line breaks 308, as discussed previously, can include line breaks deliberately placed, such as at the end of a paragraph, while unintended line breaks 309 can include line breaks that result of the application of a certain text format to Teletext portion 321. For example, as illustrated by Teletext format 301, an unintended line break 309 is placed after every 10 characters of Teletext portion 321. For purposes of discussion, it is assumed that each deliberate line break 308 occupies a character position of Teletext portion 321 while unintended line breaks 309 do not occupy a character position since they are a result of an application of Teletext format 301.

Line break parser 230, in at least one embodiment, receives Teletext portion 321, removes some or all of unintended line breaks 309, removes any excess space characters 307 caused by deliberate line breaks 308 and/or line formatting, and outputs the results as character stream 310. As illustrated in FIG. 3, line break parser 230 begins at the first character of Teletext portion 321 (identified in FIG. 3 by "A") and adds or removes characters from Teletext portion 321 based on their type and position. For example, stream portions 311–314 can be generated from lines 1A–4A of Teletext portion 321 respectively. For first stream portion 311, the first nine characters from line 1A ("A"-"I") are added to character stream 320. However, the last character of line 1A, a space character 307 ("J"), was placed in line 1A since the next word (the first five characters "K"-"O" of line 2) could not fit within the 10 character width limit of line 1A, so space character 307 ("J") was added at the last character position of line 1A. However, line break parser 230, in one embodiment, excludes extra space characters 307 from character stream 320, so space character 307 ("J") in the tenth character position of line 1A is omitted from character stream 320. In addition, unintended line breaks 309 from line 1A and subsequent lines, in one embodiment, are parsed from Teletext portion 321 and are therefore not added to character stream 310.

After line 1A of Teletext portion 321 is parsed by line parser 230, line 2A of Teletext 321 can be analyzed for parsing. As illustrated, line 2A includes deliberate line break 308 in the sixth character position (between "O" and "P"). Accordingly, line break parser 230 adds deliberate line break 308 of line 2A as well as the five characters 306 ("K"-"O") previous to deliberate line break 308 to character stream 310 as second stream portion 312. Note that since deliberate line break 308 is used to indicate a line break before the end of the tenth character position ("S") of line 2, four space characters 307 ("P"-"S") are included in line 2A after deliberate line break 308 as character position fillers. Line break parser 230 discards these four extra space characters 307 ("P"-"S"), if present, as with the extra space character 307 ("J") from line 1A. Line break parser 230, as illustrated, adds all 10 characters of line 3A ("T"-"Cc") to character stream 310 as third stream portion 313 since line 3A does not contain any extra space characters 307 or deliberate line breaks 308. As with line 2A, all alphanumeric characters 306 and space characters 307 ("Dd"-"Jj") from line 4A before the deliberate line break 308 (between "Jj" and "Kk"), as well as the deliberate line break 308 of line 4A, are added to character stream 310 as fourth stream portion 314, while the two extra space characters 307 ("Kk" and "Ll") behind deliberate line break 308 are discarded. However, because line 3A ended with an alphanumeric character 306 ("Cc"), in one embodiment, an extra space character 307 ("Zz") is added between third stream portion 313 and fourth stream portion 314 of character stream 310 to separate the word represented by alphanumeric characters 306 ("X"-"Cc") at the end of line 3A and the word represented by alphanumeric characters 306 ("Dd"-"Ee") at the beginning of line 4A. Otherwise the alphanumeric characters 306 ("X"-"Ee") representing two separate words would run together in character stream 310, and as a result, be interpreted together as a single word.

As a result of parsing of unintended line breaks 309 and/or extra space characters 307 from Teletext portion 321, in this example, the number of characters is reduced from 40 characters in Teletext portion 321 to 35 characters in character stream 310. Note that character stream 310, as illustrated, includes a string of alphanumeric characters 306, space characters 307, and/or deliberate line breaks 308, but without the unintended line breaks 309 included in Teletext portion 321. Character stream 310, in this case, represents a single continuous line of text where deliberate line breaks 308 are represented by a single character position rather than a jump to a new line.

Character stream 310, in one embodiment, is sent to line convertor 240 for conversion to EIA-608 portion 322 having EIA-608 format 302. As illustrated in FIG. 3, EIA-608 portion 322 includes a plurality of subtitle lines having up to 8 characters per line (in actuality, the Closed Captioning format calls for up to 32 characters per line). Accordingly, in one embodiment, line convertor 240 partitions character stream 310 into Closed Captioning (CC) portions 331–335 corresponding to lines 1B–5B of EIA-608 portion 322. Character stream 310, in one embodiment, is partitioned based on the assumptions that a series of adjacent non-space characters (alphanumeric characters 306) comprise a word, that words in character stream 310 are separated by a space character 307 and/or a deliberate line break 308, and that a word is not to be split between two or more lines unless absolutely necessary. For example, line 1B of EIA-608 portion 322 can be generated from the first 8 characters of character stream 310 ("A"-"H") since the eighth character ("H") is the end of a word and since a deliberate line break 308 does not exist in the sequence of eight characters. Accordingly, line convertor 240 places first closed captioning portion 311 with line 1B of EIA-608 portion 322. Line convertor 240 can then examine the next sequence of characters (second CC portion 332). Since second CC portion 332 begins with a space character 307 ("I"), this space character 307 ("I") is dropped since it is generally preferable to start a line of EIA-608 portion 322 with an alphanumeric character 306. Accordingly, line 2B is populated with second CC portion 332 starting at alphanumeric character 306 ("K"). As illustrated, second closed captioning portion 332 contains deliberate line break 308 at the sixth character position of the seven character sequence (between "O" and "T"). As a result, the five characters ("K"-"O") preceding deliberate line break 308 in second CC portion 332 and the deliberate line break 308 are copied into line 2B of EIA-608 portion 322.

To generate line 3B of EIA-608 portion 322, line convertor 240 analyzes the next sequence of eight characters starting at the character position ("T") following deliberate line break 308 of line 2B. Since the end of the eight character sequence ends within a word (between "Z" and "Aa"), a decision on how to place the word ("X"-"Cc") should be made by line convertor 240. In one embodiment, words that extend past the border of one line are moved in whole to the next line, and the subsequent portion of character stream 310 is shifted accordingly. However, character stream 310 could include words (or a sequence of non-space characters) that are longer than the character width of the subtitle lines of EIA-608 format 302. For example, in the German language, many words are generated by the combination of other words, resulting in words that have a relatively long sequence of letters, such as "Generalstaatsverordnetenversammlungen". In this example, the length of the German word exceeds the maximum character width of 32 characters for a Closed Captioning subtitle line. In one embodiment, this dilemma is solved by placing a '-' character at the end of the first part of the word on one line and placing the second part of the word at the beginning of the next line. For example, the six character word ("X"-"Cc") of line 3A of Teletext portion 321 could be split into two portions separated by a '-' character. The first three characters of the seven character word ("X"-"Z") followed by a '-' character could be placed at the end of line 3, while the remaining three characters ("Aa"-"Cc") of the word could be placed at the beginning of line 4B of EIA-608 portion 322.

Since line 4B would have five character spaces remaining, line convertor 240 could select the next five characters from character stream 310 to add to line 4B. However, the fifth character falls within a word. In this case, line convertor 240 could place the first two characters ("Dd"-"Ee") in line 4B and drop the space character 307 ("I") since the word (characters "Dd"-"Ee") is located at the end of line 4B and the following word (characters "Gg"-"Jj") is located at the beginning of line 5B, and is, therefore, not needed to separate the two words. The remaining characters ("Gg"-"Jj") of character stream 310 (fifth CC portion 335) can be added by line convertor 240 to line 5B of EIA-608 portion 322. In one embodiment, end-of-page identifier 341 is placed in the character position following the last character of character stream 310. End-of-page identifier 341 can be used to indicate the end of a converted Teletext page (Teletext portion 321), such as a Teletext subtitle page. In this case, rate modulator 250 (FIG. 1), when handling EIA-608 portion 322, could perform an action (or not perform an action) when it reaches end-of-page identifier 341. For example, end-of-page identifier 341 could signal rate modulator 250 to pause the output of the contents of its FIFO buffer (as discussed previously), change its output rate, and the like.

Figure 4:
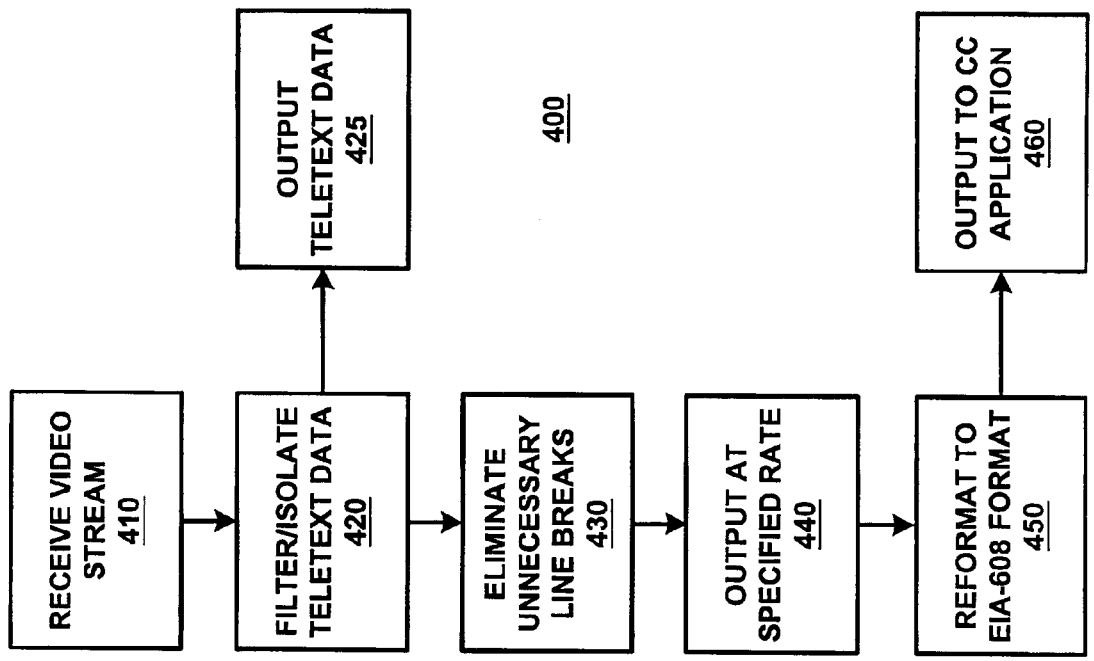
FIG. 4 is a flow diagram illustrating a method of converting text data from a Teletext format to a Closed Captioning format according to at least one embodiment of the present invention.

Referring next to FIG. 4, a method for converting Teletext text to Closed Captioning text is illustrated according to at least one embodiment of the present invention. Conversion method 400 initiates with step 410, wherein video stream 105 (FIG. 1) is received by dual mode text processing system 101 (FIG. 1). Video stream 105, in one embodiment, includes embedded data representative of one or more Teletext pages of text. For example, video stream 105 can include a television broadcast, a satellite broadcast, a video stream transmitted over a network, and the like. In one embodiment, video stream 105 is received by capture driver 110 (FIG. 1) of dual mode text processing system 101. Capture driver 110 preprocesses video stream 105 for further processing. For example, in one embodiment capture driver 110 separates video stream 105 into video display data and into data that is transmitted during the vertical blanking interval (VBI). The VBI data, in one embodiment, is transferred to Teletext decoder 125 (FIG. 1) wherein Teletext data 205 (FIG. 2) is extracted from the VBI data. Recall that Teletext data 205 is representative of the Teletext portion of video stream 105.

In step 420, a desired portion of Teletext data 205 (FIG. 2) is identified by filter 210 (FIG. 2) of format convertor 150 (FIG. 1). As discussed previously, in one embodiment, the desired portion is identified based on a page identifier determined by a user, determined from a country origin or a transmission source, or a combination thereof. For example, the desired portion of Teletext data 205 could include a subtitle page. In this case, the page identifier could be page 888, since page 888 is a page number generally assigned to the Teletext subtitle page.

After the desired portion is identified by filter 210 (FIG. 2), in one embodiment, a copy of the desired portion is made and the copy is sent for conversion while the original Teletext data 205 (FIG. 2) is output to Teletext proxy 135 (FIG. 1) in step 425. This way, dual mode text processing system 101 (FIG. 1) can use the embedded text data in video stream 105 (FIG. 1) in both its native Teletext format as well as part or all of it in a EIA-608 format after conversion. For example, dual mode text processing system 101 could be implemented as part of a television tuner card on a computer. A number of applications could be running on the computer that uses the embedded text. For example, a CC application 190 (FIG. 1) could be running that analyzes CC text for certain keywords. At the same time, a viewer could desire to view video stream 105 on display 160 (FIG. 1) along with the associated subtitles in a separate window run by Teletext application 145 (FIG. 1). Accordingly, a copy of the subtitle portion of the Teletext data of video stream 105 could be converted into a Closed Captioning format for use by CC application 190 while the original Teletext data could be further processed in a conventional Teletext processing manner for use by Teletext application 145.

In step 430, the desired portion of Teletext data 205 (Teletext portion 321, FIG. 3), in one embodiment, is parsed by line break parser 230 (FIG. 2) to eliminate one or more of unintended line breaks 309 (FIG. 3) and/or extra space characters 307 (FIG. 3), as discussed previously. The resulting character stream 310 (FIG. 3), in one embodiment, is then converted to EIA-608 portion 322 (FIG. 3) having an EIA-608 format by line convertor 240 (FIG. 2) in step 440. Conversion of Teletext portion 321 to EIA-608 portion 322 can include the step of parsing character stream 310 into multiple Closed Captioning lines having a maximum character length (generally 32 characters per line for Closed Captioning, as well as inserting '-' characters to indicate a word continued on a next line, and so on. As discussed previously, the character transmission rates of a video system based on a Teletext format often differ greatly from the transmission rates of Closed Captioning-based video systems. Accordingly, in step 440, EIA-608 portion 322 (FIG. 3), in one embodiment, is output at a controlled rate by rate modulator 250 (FIG. 2) to prevent display or processing errors by the intended recipient of EIA-608 portion 322, such as CC application 190 (FIG. 1) or display 160 (FIG. 1). The output rate could be experimentally determined to provide a suitable tradeoff between the size of a FIFO buffer used to buffer EIA-608 portion 322 and the rate of display or processing of the output of rate modulator 250. Alternatively, the output rate could be determined dynamically based on the size of the FIFO buffer, so that when the buffer is close to full, the output rate increases, and when the buffer is close to empty, the output rate decreases. In step 450, EIA-608 encoder 260 (FIG. 2), in one embodiment, reformats the output of rate modulator 250 (FIG. 2) to a format compatible with CC application 190 (FIG. 1). For example, in at least one embodiment, EIA-608 encoder 260 outputs EIA-608 portion 322 as character pairs, in accordance with an EIA-608 specification. In step 460, the output (EIA-608 data 255, FIG. 2) of EIA-608 encoder 260 (FIG. 2), in one embodiment, is sent to closed captioning decoder 130 (FIG. 1) wherein it is converted into a suitable format for further rendering for display or further processing by rendering/processing module 140 (FIG. 1). The output of rendering/processing module 140 can be handled in a variety of ways. In one embodiment, the output is displayed on display 160 (FIG. 1) as Closed Captioning subtitles along with the video display data from capture driver 110 (FIG. 1). In another embodiment, the output can be stored in file storage 170 (FIG. 1) or in memory buffer 180 (FIG. 1) for later retrieval. Additionally, in at least one embodiment, the output is sent to one or more CC applications 190 (FIG. 1) for further processing or analysis. For example, CC application 190 can include a search engine that searches closed captioning text for keywords, a transcript application that creates a text transcript of a television program, and the like. CC applications 190 that would otherwise be unable to process or manipulate the embedded text data in the Teletext format could now do so, as a result of a conversion of the embedded text data from a Teletext format to an EIA-608 format as described according to at least one embodiment of the present invention.

It should be appreciated that although the previous discussion focuses mainly on the conversion of text data having a Teletext format to text data having an EIA-608, or Closed Captioning, format, the methods and/or systems discussed herein can also be applied to other text format conversions with minimal modification. For example, in one embodiment, video stream 105 (FIG. 1) can include text data having an EIA-608 format. In this embodiment, format convertor 150 (FIG. 1) can receive the output of line 21 decoder 120 (FIG. 1), filter the output for a desired portion using filter 210 (FIG. 2), parse the desired portion of unnecessary line breaks and extra space characters to generate a character stream (similar to character stream 310, FIG. 3). The character stream could be parsed into subtitle lines having a maximum of 40 characters per line (according to a Teletext specification) by line convertor 240 (FIG. 2). The output of line convertor 240 could then be buffered by rate modulator 250 (FIG. 2) and output at a specific rate, determined empirically or dynamically. The output of rate modulator 250 could then be sent to Teletext proxy 135 (FIG. 1) for use by Teletext application 145 (FIG. 1) or for display on a Teletext-enabled display, such as a television produced for the European Union market.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

One of the implementations of the invention is as sets of computer readable instructions resident in the random access memory of one or more processing systems configured generally as described in FIGS. 1–4. Until required by the processing system, the set of instructions may be stored in another computer readable memory, for example, in a hard disk drive or in a removable memory such as an optical disk for eventual use in a compact disc (CD) drive or digital versatile disc (DVD) drive or a floppy disk for eventual use in a floppy disk drive. Further, the set of instructions can be stored in the memory of another processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information. The preceding detailed description is, therefore, not to be taken in a limiting sense, and the scope of the present invention is defined only by the appended claims.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
    identifying a first text portion having a first format, wherein the first text portion is embedded in a video stream;
    converting the first text portion having the first format to a second text portion having a second format different from the first format; and
    providing the second text portion to an application, wherein the application is to analyze the second text portion for at least one keyword.

2. The method of claim 1, wherein:
    the first format includes a Teletext format; and
    the second format includes a Closed Captioning format.

3. The method of claim 2, wherein the first text portion is part of a subtitle page.

4. The method of claim 1, wherein:
    the first format includes a Closed Captioning format; and
    the second format includes a Teletext format.

5. The method of claim 1, wherein identifying includes:
    filtering the first text portion to identify a desired portion; and
    copying a set of data associated with the desired portion when the desired portion is identified.

6. The method of claim 5, wherein the desired portion is identified based on a page identifier.

7. The method of claim 6, wherein the page identifier identifies a subtitle page.

8. The method of claim 6, wherein the page identifier is determined based on a transmission source of the video stream.

9. The method of claim 6, wherein the page identifier is determined based on user input.

10. The method of claim 1, wherein converting includes reformatting the first text portion from a first character display format to a second character display format to generate a converted text portion.

11. The method of claim 10, wherein:
    the first character display format includes a maximum N characters-per-display line format; and
    the second character display format includes a maximum M characters-per-display line format, where N and M are different integer numbers.

12. The method of claim 11, wherein N is 40 and M is 32.

13. The method of claim 10, wherein reformatting includes eliminating an unintended line break while keeping a deliberate line break.

14. The method of claim 1, wherein the application is to generate a transcript based on the second text portion.

15. The method of claim 1, wherein the application is to display the second text portion as Closed Captioning text.

16. The method of claim 1, wherein the application is to buffer the second text portion to provide a Closed Captioning history navigable by a user.

17. The method of claim 1, wherein the second text portion is provided to the application at a specified rate.

18. The method of claim 17, wherein the specified rate is determined experimentally.

19. The method of claim 17, wherein the specified rate is determined based on a size of a buffer used to buffer the second text portion before the second text portion is provided to the application.

20. A method comprising:
    filtering a set of Teletext data to identify a first set of text; and
    converting the first set of text from a first character display format to a second set of text having a second character display format different from the first character display format, wherein converting includes eliminating an inadvertent line break while keeping a deliberate line break.

21. The method of claim 20, wherein the second character display format is based on a Closed Captioning format.

22. The method of claim 20, wherein the first set of text is identified based on a page identifier.

23. The method of claim 22, wherein the page identifier identifies a subtitle page.

24. The method of claim 22, wherein the page identifier is determined based on a transmission source of the video stream.

25. The method of claim 22, wherein the page identifier is determined based on user input.

26. The method of claim 22, wherein the page identifier includes a subtitle identifier flag in the set of Teletext data.

27. The method of claim 20, wherein:
    the first character display format includes a maximum N characters-per-display line format; and
    the second character display format includes a maximum M characters-per-display line format, where N and M are different integer numbers.

28. The method of claim 27, wherein N is 40 and M is 32.

29. The method of claim 20, wherein the first set of text is part of a subtitle page of the Teletext data.

30. The method of claim 20, wherein filtering includes generating a copy of the first set of text used for performing the step of converting.

31. The method of claim 20, further including providing the second embedded text portion to an application, wherein the application is to utilize the second embedded text portion.

32. The method of claim 31, wherein the second set of text is provided to the application at a specified rate.

33. The method of claim 32, wherein the specified rate is determined experimentally.

34. The method of claim 32, wherein the specified rate is determined dynamically based on a size of a buffer used to buffer the second text portion before the second text portion is provided to the application.

35. The method of claim 32, wherein the application is to analyze the second text portion for at least one keyword.

36. The method of claim 32, wherein the application is to generate a transcript based on the second text portion.

37. The method of claim 32, wherein the application is to display the second text portion as Closed Captioning text.

38. The method of claim 32, wherein the application is to buffer the second text portion to provide a Closed Captioning history navigable by a user.

39. A system comprising:
a filter to identify a first portion of a text portion embedded in a video stream, said text portion having a first character display format;
a line parser to parse one or more characters from said first portion to generate a character stream; and
a line converter to convert said character stream to a second portion having a second character display format.

40. The system of claim 39, wherein the first character display format includes a Teletext display format and the second character display format includes a Closed Captioning format.

41. The system of claim 39, wherein the first character display format includes a Closed Captioning display format and the second character display format includes a Teletext format.

42. The system of claim 39, wherein the first character display format includes a maximum N characters-per-display line format and the second character display format includes a maximum M characters-per-display line format, where N and M are different integer numbers.

43. The system of claim 42, wherein N is 40 and M is 32.

44. The system of claim 42, wherein N is 32 and M is 40.

45. The system of claim 39, wherein said text portion includes a subtitle identifier flag associated with said first portion, and wherein said subtitle identifier flag is used by said filter to identify said first portion.

46. The system of claim 39, wherein said first portion is identified based on a page identifier.

47. The system of claim 46, wherein said page identifier includes a subtitle page.

48. The system of claim 46, wherein the page identifier is determined based on a transmission source of said video stream.

49. The system of claim 46, wherein said page identifier is determined based on user input.

50. The system of claim 39, further including a copy module to generate a copy of the first portion and wherein said copy of the first portion is used by said line parser.

51. The system of claim 39, further including an application to utilize said second portion.

52. The system of claim 51, further including a rate modulator to output said second portion at a first output rate to said application.

53. The system of claim 52, wherein said first output rate is determined experimentally.

54. The system of claim 52, wherein said first output rate is determined dynamically.

55. The system of claim 54, wherein said rate modulator includes a buffer to buffer said second portion, and where said first output rate is determined based on an extent to which said buffer is populated.

56. The system of claim 52, wherein said rate modulator further is to:
compare said second portion with a previous portion of said text portion converted by said line converter to detect a substantial match; and
exclude said second portion from being provided to said application when a substantial match is detected.

57. The system of claim 51, wherein said application is to analyze said second text portion for at least one keyword.

58. The system of claim 51, wherein said application is to generate a transcript based on said second text portion.

59. The system of claim 51, wherein said application is to display said second text portion as Closed Captioning text.

60. The system of claim 51, wherein said application is to buffer said second text portion to provide a Closed Captioning history navigable by a user.

61. A computer readable medium, said computer readable medium including instructions to manipulate a processor to:
identify a first text portion having a first format, wherein the first text portion is embedded in a video stream;
convert the first text portion having the first format to a second text portion having a second format different from the first format; and
provide the second text portion to an application, wherein the application is to analyze the second text portion for at least one keyword.

62. The computer readable medium of claim 61, wherein:
the first format includes a Teletext format; and
the second format includes a Closed Captioning format.

63. The computer readable medium of claim 62, wherein the first text portion is part of a subtitle page.

64. The computer readable medium of claim 61, wherein:
the first format includes a Closed Captioning format; and
the second format includes a Teletext format.

65. The computer readable medium of claim 61, wherein said instructions to manipulate said processor include instructions to manipulate said processor to:
filter the first text portion to identify a desired portion; and
copy a set of data associated with the desired portion when the desired portion is identified.

66. The computer readable medium of claim 65, wherein the desired portion is identified based on a page identifier.

67. The computer readable medium of claim 66, wherein the page identifier includes a subtitle identifier flag associated with the first text portion in the video stream.

68. The computer readable medium of claim 66, wherein the page identifier identifies a subtitle page.

69. The computer readable medium of claim 66, wherein the page identifier is determined based on a transmission source of the video stream.

70. The computer readable medium of claim 66, wherein the page identifier is determined based on user input.

71. The computer readable medium of claim 61, wherein said instructions to manipulate said processor to convert include instructions to manipulate said processor to reformat the first text portion from a first character display format to a second character display format to generate a converted text portion.

72. The computer readable medium of claim 71, wherein:
the first character display format includes a maximum N characters-per-display line format; and
the second character display format includes a maximum M characters-per-display line format, where N and M are different integer numbers.

73. The computer readable medium of claim 72, wherein N is 40 and M is 32.

74. The computer readable medium of claim 71, wherein said instructions to manipulate said processor to reformat include instructions to manipulate said processor to eliminate an unintended line break while keeping a deliberate line break.

75. The computer readable medium of claim 61, wherein the application is to generate a transcript based on the second text portion.

76. The computer readable medium of claim 61, wherein the application is to display the second text portion as Closed Captioning text.

77. The computer readable medium of claim 61, wherein the application is to buffer the second text portion to provide a Closed Captioning history navigable by a user.

78. The computer readable medium of claim 61, wherein the second text portion is provided to the application at a specified rate.

79. The computer readable medium of claim 78, wherein the specified rate is determined experimentally.

80. The computer readable medium of claim 78, wherein the specified rate is determined based on a size of a buffer used to buffer the second text portion before the second text portion is provided to the application.

* * * * *